No. 726,027. PATENTED APR. 21, 1903.
J. H. CARR.
SCALE.
APPLICATION FILED AUG. 21, 1902.
NO MODEL.
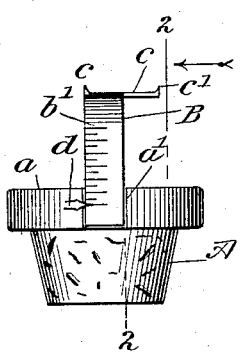
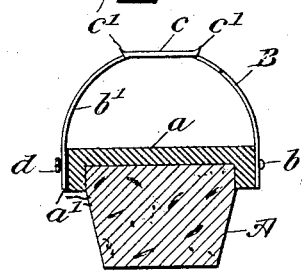
INVENTOR

UNITED STATES PATENT OFFICE.

JAMES HUGH CARR, OF DUBUQUE, IOWA.

SCALE.

SPECIFICATION forming part of Letters Patent No. 726,027, dated April 21, 1903.

Application filed August 21, 1902. Serial No. 120,474. (No model.)

*To all whom it may concern:*

Be it known that I, JAMES HUGH CARR, a citizen of the United States, and a resident of Dubuque, in the county of Dubuque and State of Iowa, have invented new and useful Improvements in Scales, of which the following is a full, clear, and exact description.

My invention relates to improvements in scales for weighing small articles, such as letters, the same being especially adapted for use in connection with a part or member of a bottle, package, or container of any kind, although the improved scale may be used generally on packages to contain commodities of different kinds.

The object of this invention is to provide a simple, cheap, and neat article which may be used advantageously on bottles, packages, or containers, such as on ink-bottles or a part thereof, the improved scales affording a convenient means for weighing letters and other small light articles.

Further objects and advantages of the invention will appear from the subjoined description, and the novelty will be defined by the annexed claim.

Reference is to be had to the accompanying drawings, forming a part of this specification, in which similar characters of reference indicate corresponding parts in both figures.

Figure 1 is a side elevation of my improved scale applied to the stopper member of a bottle, and Fig. 2 is a vertical cross-section on the line 2 2 of Fig. 1.

In the drawings the stopper A is provided with a head $a$, in one edge of which is formed a groove $a'$. The spring B is bowed to conform to the curvature of the edge of the stopper-head, and said spring is pivotally connected at $b$ to the head, on one side thereof. The free end $b'$ of the spring is loosely or slidably fitted in the recess $a'$, the latter serving as a guide to direct the spring when it is depressed by the weight of a letter which may be imposed thereon. The middle portion of the spring B is enlarged to form a scale-pan $c$, adapted to prevent the displacement of the article which is placed on the scale-spring. The free end $b'$ of said spring is graduated, as shown by Fig. 1, and this graduated end or arm of the spring has movement relative to an index or pointer $d$, the latter being arranged to extend across the graduated spring-arm and being secured to the head of the bottle-stopper by any suitable means—such, for example, as by forming the pointer with a tooth or prong adapted to be embedded in the head $a$ in a way to permit a limited adjustment of the pointer, thus securing accuracy in the indication of the weight.

The construction herein disclosed affords a simple, cheap, and efficient article which may be supplied with the stoppers of ink-bottles or various other kinds of containers. The bowed spring B can be stamped from a single piece of sheet metal and attached easily to the stopper, said spring being foldable along the side of the stopper in order to occupy a compact relation thereto when the complete article is packed for shipment or storage.

Having thus described my invention, I claim as new and desire to secure by Letters Patent—

As a new article of manufacture, a bottle member having a pointer, a foldable bowed spring pivoted to said member and adjustable to extend across the bottle member and for its free end to traverse said pointer, and a pan on said spring.

In testimony whereof I have signed my name to this specification in the presence of two subscribing witnesses.

JAMES HUGH CARR.

Witnesses:
B. W. BRIGGS,
C. K. MATHIS.